Dec. 18, 1928.  
A. T. CLARK ET AL  
JUNCTION BOX MOUNTING  
Filed June 6, 1925

Dec. 18, 1928.  1,695,633
A. T. CLARK ET AL
JUNCTION BOX MOUNTING
Filed June 6, 1925  2 Sheets-Sheet 2
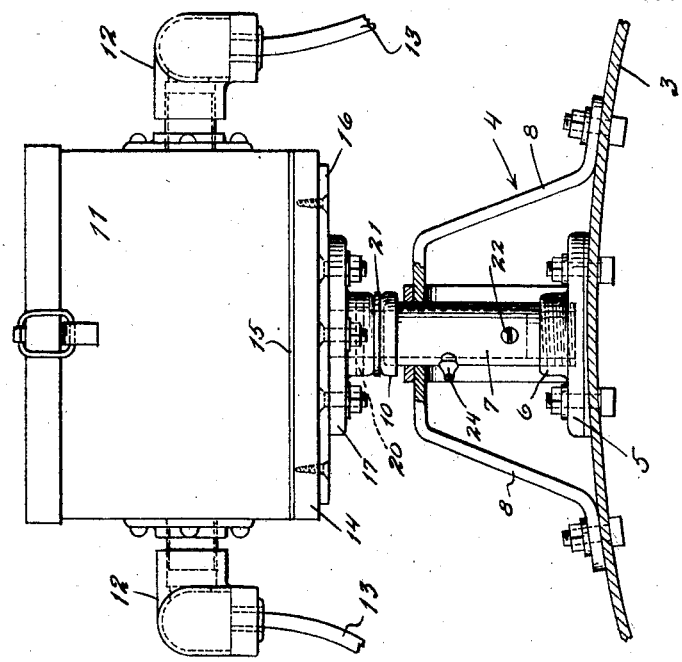
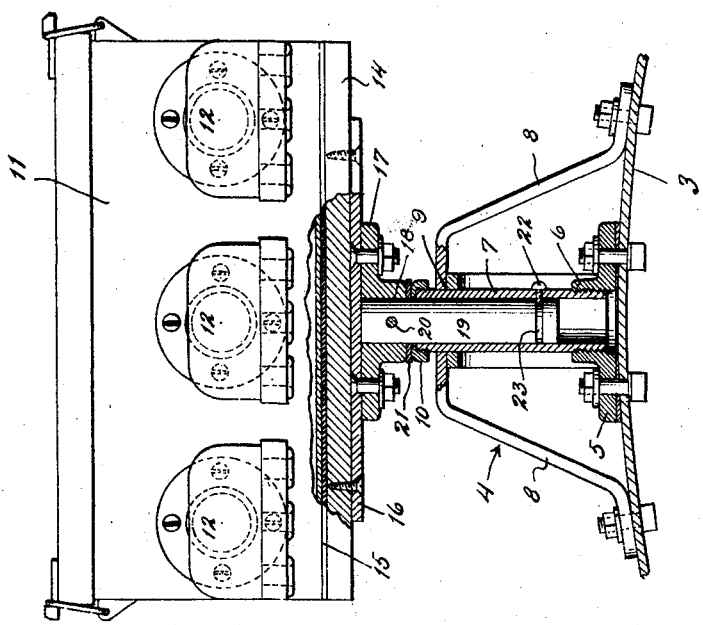
Inventor
Alfred T. Clark
Henry A. Leonhauser
Roland Jester
Ernest Speck
By
His Attorney Patented Dec. 18, 1928.

1,695,633

UNITED STATES PATENT OFFICE.

ALFRED T. CLARK, HENRY A. LEONHAUSER, AND JOHN R. JESTER, OF BALTIMORE, MARYLAND.

JUNCTION-BOX MOUNTING.

Application filed June 6, 1925. Serial No. 35,474.

The invention relates to articulated electric railway cars, particularly to the electrical equipment therefor.

The principal object of the invention, generally stated, is to provide a junction box mounting characterized by ready accessibility for the purpose of making installations, connections and repairs.

It is a common practice to locate the junction box of an electric railway car beneath the car but it is quite obvious that such a position is unsatisfactory for the reason that it is a more or less difficult matter to obtain access thereto for any purpose as it is necessary that a workman either lift a trap door in the car floor and reach down, or else that he crawl under the car. A disadvantage is that the workman must perform any needed operations while in an uncomfortable position and in a cramped space which is, furthermore, generally dark, requiring the use of an extension light or other illuminating means so that the box and the associated elements and surroundings may be seen. Furthermore, in the case of an articulated car including pivotally connected sections it is obvious that the cables or conduits therefor must move whenever the car travels about or along a curve. This almost constant moving of the cables subjects them to an unusual and in fact excessive internal friction which may, within a comparatively short time, cause disintegration of the cables themselves and breaking loose of the terminal connections.

It is with the above facts in view that we have designed the present invention which has for a more specific object the provision of a junction box mounting whereby the box will be located at the top of the drum which constitutes or which is located at the pivotal connection of the car sections, the box and the cables leading thereto being in an entirely exposed position and consequently capable of instant and ready access whenever repairs are needed, there being ample space enabling a workman to perform any needed operations in a convenient and comfortable manner so that time and labor will be saved, the box and its connections being clearly visible under ordinary lighting conditions.

An important object of the invention is to provide a mounting permitting rotary movement of the junction box so that it and the cables connected therewith will automatically adjust themselves as the car travels about or along curves. Obviously there will be less bending of the cables or conduits and less strain on the connections.

A further object of the invention is to provide a mounting of such character that the junction box may be bodily removed from the mounting in case such is found desirable for any reason.

To the attainment of the foregoing and other objects and advantages, the invention preferably consists in the construction, arrangement and combination of parts to be hereinafter more fully described and claimed, and illustrated in the accompanying drawings in which:

Figure 2 is a side elevation of the box and its mounting, parts being broken away and in section; and Figure 3 is an elevation at right angles to Figure 2.

Figure 1:
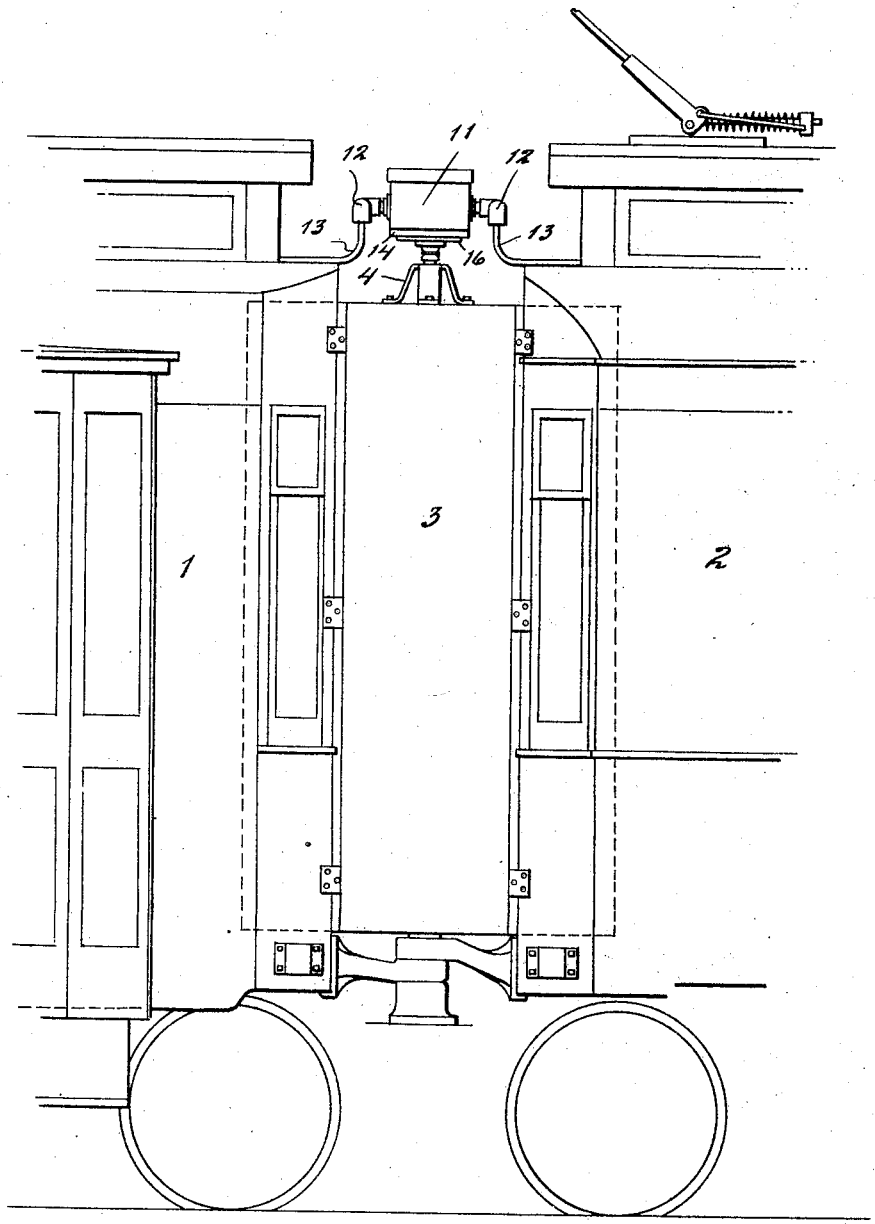
Figure 1 is a side elevation of a portion of an electric railway car showing the articulation and illustrating the junction box and its mounting in position.

Referring more particularly to the drawings, the numerals 1 and 2 designate the meeting ends of the two sections of an articulated electric railway car, and 3 represents the upright cylindrical drum mounted at the pivotal connection.

In carrying out the present invention we provide a bearing structure indicated generally at 4, which bearing structure preferably includes a socket member 5 bolted or otherwise suitably secured upon the drum 3 at the center thereof. The socket member is shown as having an upstanding internally threaded flange 6 within which is screwed or otherwise secured an upstanding tubular bearing element 7 which may, in actual practice, be a section of pipe. The bearing structure is further shown as including a spider-like bracket of angular formation with its arms 8 located outwardly of the socket member 5 and suitably secured to the top of the drum. This bracket device may conveniently be formed of strips bent into the desired shape and arranged in cross relation, though this is a mechanical detail which is immaterial. The upper portion of this bracket member is provided with a suitable opening 9 receiving the tubular member 7 so that the latter will be effectually braced and held rigidly in upright position. At its top the tubular member 7 is preferably provided with a cap 10 held thereon in any desired manner and serving as a bearing element.

The junction box itself is designated by the numeral 11 and is of any ordinary or preferred type and equipped with the usual connections 12 for the cables 13. Within the box it is preferable that the connecting means for the cables consist of knuckle members carried by the cables and having proper engagement, the knuckle connection permitting the cables to accommodate themselves to the movement of the car sections, though it should be understood that a panel board may be substituted if desired. In accordance with the invention the box is mounted upon a slab 14 of wood or other non-conducting material, it being preferable that a sheet of rubber 15, or the like, be interposed between the slab and the box. Beneath the slab is secured a metallic plate 16 to which is fastened, by any suitable means, a socket member 17 having a bore 18 receiving the upper end of a depending trunnion 19 rotatably engaged within the tubular member 7. A transverse pin 20 or the like may be used for the purpose of holding the trunnion rigid with respect to the socket member 17. As an added refinement, we may provide a washer 21 located between the cap 10 and the confronting face of the socket member 17.

Gravity alone may be relied upon for holding the box and its trunnion in proper position with respect to its bearing support, though, if preferred, a positive retaining means may be provided, such, for instance, as the screw 22 passing through one side of the member 7 and engaging within a groove 23 in the trunnion. Obviously, any equivalent may be substituted.

As the trunnion is intended to rotate within the tubular member 7 any suitable lubricating means such as the cup shown at 24 may be provided whereby oil or grease may be supplied to the bearing surfaces.

In the use of the device it is quite apparent that when mounted on the drum which is located at the pivotal connection of the car sections, the device is readily accessible at all times and in plain view so that disconnection or bad condition of the wires and connections therefor may be quickly seen. Furthermore, as the box is rotatable with respect to its bearing and supporting bracket it can readily accommodate itself to various positions which might be caused by flexing or bending of the conductors or conduits when the car is passing over curved track. Obviously, there must be a certain amount of slack in all of the cables or conductors as otherwise breaking strain would come upon them when the car passes over curved track. With the junction box pivotally mounted as disclosed, it is obvious that when the car sections pivot in rounding a curve the cables at the outside will become taut while those at the inside of the curve will slacken to a still greater extent than originally. The pull upon the outside cables will naturally cause the box to assume an intermediate position or with its longitudinal axis bisecting the angle between the transverse axes of the car sections. For this reason there will be less internal friction produced in the conduits or conductors and they will consequently remain in better condition than is ordinarily the case and be capable of prolonged use before replacement is necessary.

While we have shown and described a preferred embodiment of the invention, it should be understood that the disclosure is merely illustrative of a very convenient construction, it being quite conceivable that many changes and modifications may be resorted to in the matter of details of construction, connection and arrangement provided such variations constitute no departure from the spirit of the invention or the scope of the appended claims.

Having thus described the invention, we claim:

1. In combination with the conducting cables and conduits of an electric railway car including articulated sections each having its own conductors, a junction box for the conductors pivotally mounted at a position in line with the axis of the car with its axis in the axis of articulation of the car sections.

2. In an electric railway car of the articulated type including pivotally connected sections and a drum at the pivotal connection, a junction box for the current conductors of the car sections pivotally mounted at the top of the drum with its axis substantially in line with the pivotal connection of the sections.

3. In an electric railway car of the articulated type including pivotally connected sections and a drum at the pivotal connection, a junction box for the current conductors of the car sections mounted at the top of the drum, and means for mounting the box whereby it will be capable of pivotal movement to accommodate flexing strains on the conductors during relative movement of the car sections.

4. In an electric railway car including articulated sections, a junction box for the current conductors of the car sections, and a pivotal mounting for the junction box located at the top of the car above the axis of articulation of the sections thereof.

5. In an electric railway car including articulated sections, a junction box for the current conductors of the car sections, and a mounting for the junction box located at the top of the car at the point of articulation of the sections thereof, the mounting including a bearing structure and a rotatable element fixed with respect to the junction box and movably mounted within the bearing structure, the rotatable element having its axis adjacent the axis of articulation of the car sections.

6. In an articulated electric railway car including sections having current conductors, a junction box for the conductors, and a bearing bracket structure mounted at the top of the car at the point of articulation and pivotally supporting the junction box in substantially coaxial relation to the axis of articulation to permit movement thereof in a horizontal plane.

7. In an articulated car, a plurality of pivotally connected sections, vestibules at the pivotal connections, and main cable supports mounted above the tops of the vestibules for maintaining the cables out of contact with the vestibules and adjacent parts.

8. In combination with a plurality of car bodies having pivotal connection and having current conductors, a junction box for the conductors of adjacent car bodies pivotally mounted with its axis substantially coincident with the axis of the pivotal connection of the car bodies.

In testimony whereof we affix our signatures.

ALFRED T. CLARK.
HENRY A. LEONHAUSER.
JOHN R. JESTER.